United States Patent
Bergstra et al.

(10) Patent No.: US 9,096,751 B2
(45) Date of Patent: Aug. 4, 2015

(54) HETEROPHASIC POLYPROPYLENE WITH EXCELLENT CREEP PERFORMANCE

(75) Inventors: Michiel Bergstra, Berchem (BE); Pauli Leskinen, Helsinki (FI); Bo Malm, Espoo (FI); Cornelia Kock, Pucking (AT)

(73) Assignee: BOREALIS AG, Vienna (AT)

( * ) Notice: Subject to any disclaimer, the term of this patent is extended or adjusted under 35 U.S.C. 154(b) by 299 days.

(21) Appl. No.: 13/635,856

(22) PCT Filed: Mar. 14, 2011

(86) PCT No.: PCT/EP2011/053807
§ 371 (c)(1),
(2), (4) Date: Aug. 7, 2013

(87) PCT Pub. No.: WO2011/117103
PCT Pub. Date: Sep. 29, 2011

(65) Prior Publication Data
US 2013/0309431 A1    Nov. 21, 2013

(30) Foreign Application Priority Data
Mar. 22, 2010 (EP) .................................. 10157223

(51) Int. Cl.
C08L 23/04 (2006.01)
C08L 23/10 (2006.01)
C08L 23/14 (2006.01)
C08L 23/12 (2006.01)
F16L 9/127 (2006.01)

(52) U.S. Cl.
CPC ............. *C08L 23/14* (2013.01); *C08L 23/10* (2013.01); *C08L 23/12* (2013.01); *F16L 9/127* (2013.01); *C08L 2666/06* (2013.01); *Y10T 428/139* (2015.01)

(58) Field of Classification Search
CPC ............................ C08L 23/12; C08L 2666/06
USPC ............................ 525/191, 232, 240; 526/65
See application file for complete search history.

(56) References Cited

U.S. PATENT DOCUMENTS

2007/0117932 A1 * 5/2007 De Palo et al. ................ 525/240

FOREIGN PATENT DOCUMENTS

| EP | 0887379 A1 | 12/1998 |
|---|---|---|
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 04000899 A1 | 12/2003 |
| WO | 2004111095 A1 | 12/2004 |
| WO | 2005014713 A1 | 2/2005 |
| WO | WO-2005/014716 A1 | 2/2005 |
| WO | 2006114358 A1 | 11/2006 |
| WO | WO-2006/114358 A2 | 11/2006 |

OTHER PUBLICATIONS

Extended European Search Report, dated Aug. 13, 2010.
Chujo, Riichiro, et al., "Two-site Model analysis of 130 n.m.r. of Polypropylene polymerized by Ziegler-Natta catalyst with external alkoxysilane donors", Polymer, 1994, vol. 35, No. 2.
Hayashi, Tetsuo, et al., "Heptad configuration analysis of 13C n.m.r. spectra in highly isotactic polypropylene", Polymer, 1998, vol. 29, January.
Heino, E-L., et al. "Rheological Characterization of Polyethylene Fractions", Theoretical and Applied Rheology, Brussels, Belgium, Aug. 17-21, 1992.

* cited by examiner

*Primary Examiner* — Nathan M Nutter
(74) *Attorney, Agent, or Firm* — Tarolli, Sundheim, Covell & Tummino LLP

(57) ABSTRACT

Heterophasic propylene copolymer comprising (a) a matrix (M) being a polypropylene (PP), said polypropylene (PP) has a polydispersity index (PI) of at least 5.0, and (b) an elastomeric propylene copolymer (EC) dispersed in said matrix (M), wherein (i) said heterophasic propylene copolymer has a melt flow rate $MFR_2$ (230° C.) of equal or below 1.0 g/10 min, (ii) the amorphous phase (AM) of the xylene cold soluble fraction (XCS) of the heterophasic propylene copolymer has an intrinsic viscosity (IV) of at least 3.5 dl/g.

15 Claims, 1 Drawing Sheet

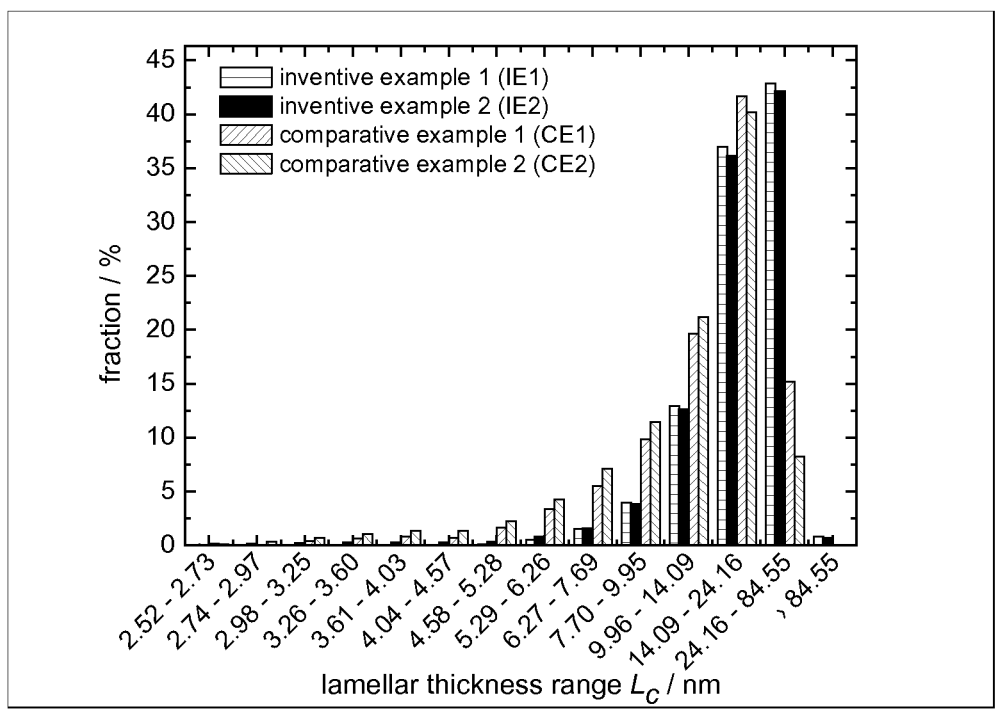
Results of SIST analysis

HETEROPHASIC POLYPROPYLENE WITH EXCELLENT CREEP PERFORMANCE

This application is a National Phase filing of PCT/EP2011/053807, filed Mar. 14, 2011, and claims priority to European Patent Application No. 10157223.8, filed Mar. 22, 2010, the subject matter of which are incorporated herein by reference in their entirety.

The present invention is directed to a new heterophasic propylene copolymer (HECO), its manufacture and use.

Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

With heterophasic polypropylenes it is possible to create material having rather acceptable rigidity and impact behavior. Such material is for instance used in the field of pipes which must withstand high pressure on the one hand and shock resistance on the other hand.

However nowadays customers require tailored materials achieving high performance for specific applications and which are processable in a time efficient manner. Accordingly there is for instance the desire in pipe industry to have easy processable polypropylene material available with excellent stiffness without losing impact.

Therefore the object of the present invention is to provide a easy processable polymer material suitable in pipe industry having excellent stiffness/impact balance.

The finding of the present invention is that the material must be a heterophasic propylene copolymer comprising as a polypropylene matrix with a broad molecular weight distribution and an elastomeric propylene copolymer having a rather high intrinsic viscosity.

Therefore the present invention is directed to a heterophasic propylene copolymer (HECO) comprising
(a) a matrix (M) being a polypropylene (PP), said polypropylene (PP) has a polydispersity index (PI) of at least 5.0, and
(b) an elastomeric propylene copolymer (EC) dispersed in said matrix (M),
wherein
(i) said heterophasic propylene copolymer (HECO) has a melt flow rate $MFR_2$ (230° C.) measured according to ISO 1133 of equal or below 1.0 g/10 min,
(ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of at least 3.5 dl/g.

Preferably the polypropylene (PP) is a random propylene copolymer (R-PP) or a propylene homopolymer (H-PP), the latter being preferred.

It has surprisingly found that the heterophasic propylene copolymer (HECO) is featured by very high stiffness without compromising the impact behavior (see examples).

In the following the invention is described in more detail.

A heterophasic propylene copolymer (HECO) according to this invention comprises a polypropylene (PP) as a matrix (M) and dispersed therein an elastomeric propylene copolymer (EC). Thus the polypropylene (PP) matrix contains (finely) dispersed inclusions being not part of the matrix (M) and said inclusions contain the elastomeric propylene copolymer (EC). The term inclusion indicates that the matrix (M) and the inclusion form different phases within the heterophasic propylene copolymer (HECO), said inclusions are for instance visible by high resolution microscopy, like electron microscopy or scanning force microscopy.

Preferably the heterophasic propylene copolymer (HECO) according to this invention comprises as polymer components only the polypropylene (PP) and the elastomeric propylene copolymer (EC). In other words the heterophasic propylene copolymer (HECO) may contain further additives but no other polymer in an amount exceeding 5 wt.-%, more preferably exceeding 3 wt.-%, like exceeding 1 wt.-%, based on the total heterophasic propylene copolymer (HECO). One additional polymer which may be present in such low amounts is a polyethylene which is a by-reaction product obtained by the preparation of heterophasic propylene copolymer (HECO) (see in detail below). Accordingly it is in particular appreciated that the instant heterophasic propylene copolymer (HECO) contains only the polypropylene (PP) matrix, the elastomeric propylene copolymer (EC) and optionally polyethylene in amounts as mentioned in this paragraph.

One essential finding of the present invention is that the heterophasic propylene copolymer (HECO) must be featured by a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the heterophasic propylene copolymer (HECO) has an $MFR_2$ (230° C.) of equal or below 1.0 g/10 min, more preferably of equal or below 0.8 g/10 min, still more preferably in the range of 0.05 to 1.0 g/10 min, yet more preferably in the range of 0.08 to 0.8 g/10 min.

Alternatively or additionally the heterophasic propylene copolymer (HECO) is defined by its crossover frequency $\omega_c$ (a parameter corresponding to the weight average molecular weight), said crossover frequency $\omega_c$ is the frequency at which the storage modulus G' and the loss modulus G" determined in a dynamic-mechanical rheology test are identical and defined as crossover modulus $G_c$. Thus it is appreciated that the heterophasic propylene copolymer (HECO) has a crossover frequency $\omega_c$ as determined by dynamic rheology according to ISO 6271-10 at 200° C. of equal or below 3.0 rad/s, preferably equal or below 2.5 rad/s, like equal or below 2.0 rad/s.

As will be explained in detail below, the matrix (M) of the heterophasic propylene copolymer (HECO) is further featured by a broad molecular weight distribution. Preferably this applies also for the overall heterophasic propylene copolymer (HECO). As outlined above the heterophasic propylene copolymer (HECO) shall be suitable as pipe material. Thus the final heterophasic propylene copolymer (HECO) must fulfill the demands of the pipe industry, however on the other hand it must be also economically processable. With a heterophasic propylene copolymer (HECO) according to this invention which is additionally featured by a broad molecular weight distribution both requirements can be met. Accordingly it is appreciated that the heterophasic propylene copolymer (HECO) has a shear thinning index SHI (3/100) measured by dynamic rheology according to ISO 6271-10 at 200° C. of at least 25, more preferably of at least 30, yet more preferably in the range of 25 to 100, still more preferably in the range of 30 to 95, like 32 to 90.

Alternatively or additionally the heterophasic propylene copolymer (HECO) has a polydispersity index (PI), defined as $10^5/G_c$ with $G_c$ being the crossover modulus as defined before, of at least 4.5, more preferably of at least 5.0, yet more preferably in the range of 4.5 to 15.0, still more preferably in the range of 5.0 to 11.0, like 5.3 to 10.0.

Preferably it is desired that the heterophasic propylene copolymer (HECO) is thermomechanically stable. Accordingly it is appreciated that the heterophasic propylene copolymer (HECO) has a melting temperature of at least 158° C., more preferably of at least 162° C., still more preferably in the range of 160 to 170° C.

Additionally it is preferred that the crystallization temperature of the heterophasic propylene copolymer (HECO) is at least 120° C., more preferably at least 122° C., still more preferably in the range of 120 to 135° C.

The heterophasic propylene copolymer (HECO) comprises apart from propylene also comonomers. Preferably the heterophasic propylene copolymer (HECO) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymers according to this invention, i.e. the heterophasic propylene copolymer (HECO), the random propylene copolymers (R-PP), and the elastomeric propylene copolymer (EC), comprise monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymers according to this invention comprise, especially consist of, monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the random propylene copolymers (R-PP)—if present—as well as the elastomeric propylene copolymer (EC) contain the same comonomers, like ethylene.

Accordingly, the elastomeric propylene copolymer (EC) is preferably an ethylene propylene rubber (EPR), whereas the polypropylene (PP) is either a random propylene copolymer (R-PP) or a propylene homopolymer (H-PP).

Additionally it is appreciated that the heterophasic propylene copolymer (HECO) preferably has a comonomer content in the range of 2.0 to 14.0 wt.-%, more preferably in the range of 2.5 to 12.0 wt.-%, yet more preferably in the range of 3.0 to 9.0 wt.-%.

The xylene cold soluble (XCS) fraction measured according to ISO6427 (23° C.) of the heterophasic propylene copolymer (HECO) is preferably below 15.0 wt.-%, more preferably in the range of 5.0 to 15.0 wt.-%, like in the range of 6.0 to 12.0 wt.-%.

The heterophasic propylene copolymer (HECO) is in particular defined by the matrix (M) and the elastomeric propylene copolymer (EC) dispersed therein. Accordingly both components are now defined in more detail.

The matrix (M) is a polypropylene (PP), more preferably a random propylene copolymer (R-PP) or a propylene homopolymer (H-PP), the latter especially preferred.

Accordingly the comonomer content of the polypropylene (PP) is equal or below 1.0 wt.-%, yet more preferably not more than 0.8 wt.-%, still more preferably not more than 0.5 wt.-%, like not more than 0.2 wt.-%.

As mentioned above the polypropylene (PP) is preferably a propylene homopolymer (H-PP).

The expression propylene homopolymer as used throughout the instant invention relates to a polypropylene that consists substantially, i.e. of more than 99.8 wt.-%, of propylene units. In a preferred embodiment only propylene units in the propylene homopolymer are detectable. The comonomer content can be determined with FT infrared spectroscopy, as described below in the example section.

In case the polypropylene (PP) is a random propylene copolymer (R-PP) it is appreciated that the random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

Additionally it is appreciated that the random propylene copolymer (R-PP) has preferably a comonomer content in the range of more than 0.2 to 1.0 wt.-%, more preferably in the range of more than 0.2 to 0.8 wt.-%, yet more preferably in the range of 0.2 to 0.7 wt.-%.

The term "random" indicates that the comonomers of the propylene copolymer (R-PP), as well as of the first random propylene copolymer (R-PP1), the second random propylene copolymer (R-PP2), and third random propylene copolymer (R-PP3), are randomly distributed within the propylene copolymers. The term random is understood according to IUPAC (Glossary of basic terms in polymer science; IUPAC recommendations 1996).

Further the polypropylene (PP) is featured by a broad molecular weight distribution. Accordingly the polypropylene (PP) has a polydispersity index (PI), defined as $10^5/G_c$ with $G_c$ being the crossover modulus as defined before, of at least 4.5, more preferably of at least 5.0, yet more preferably in the range of 4.5 to 15.0, still more preferably in the range of 5.0 to 12.0, like 5.5 to 11.0.

Additionally or alternatively the polypropylene (PP) has a shear thinning index SHI (3/100) measured by dynamic rheology according to ISO 6271-10 at 200° C. of at least 20, more preferably of at least 25, yet more preferably in the range of 20 to 110, still more preferably in the range of 25 to 105, like 30 to 100.

As stated above the heterophasic propylene copolymer (HECO) has a rather low melt flow rate. Accordingly, the same holds true for its matrix (M), i.e. the polypropylene (PP). Thus it is preferred that polypropylene (PP) has an $MFR_2$ (230° C.) of equal or below 1.0 g/10 min, more preferably of equal or below 0.8 g/10 min, still more preferably in the range of 0.05 to 1.0 g/10 min, yet more preferably in the range of 0.08 to 0.8 g/10 min.

Alternatively or additionally the polypropylene (PP) is defined by a high molecular weight. Thus it appreciated that the polypropylene (PP) has a weight average molecular weight (Mw) measured by gel permeation chromatography (GPC; ISO 16014-4:2003) of at least 500 kg/mol, more preferably of at least 600 kg/mol, yet more preferably in the range of 500 to 10,000 kg/mol, still more preferably in the range of 600 to 5,000 kg/mol.

Further the polypropylene (PP) can be defined by the crossover frequency $\omega_c$. Thus it is appreciated that the polypropylene (PP) has a crossover frequency $\omega_c$ as determined by dynamic rheology according to ISO 6271-10 at 200° C. of equal or below 3.0 rad/s, preferably equal or below 2.5 rad/s.

The xylene cold soluble (XCS) content of the polypropylene (PP) is rather moderate. Accordingly xylene cold soluble (XCS) content measured according to ISO 6427 (23° C.) is preferably equal or below 3.5 wt.-%, more preferably equal or below 3.0 wt.-%, still more preferably in the range of 0.5 to 3.5 wt.-%, like in the range of 0.5 to 3.0 wt.-%.

The matrix (M), i.e. the polypropylene (PP) can be further defined by its crystalline fractions determined by the stepwise isothermal segregation technique (SIST). The stepwise isothermal segregation technique (SIST) provides a possibility to determine the lamella thickness distribution. The precise measuring method is specified in the example section. Thereby rather high amounts of polymer fractions crystallizing at high temperatures indicate a rather high amount of thick lamellae. Thus it is appreciated that the polypropylene (PP) comprises at least 25.0 wt.-%, more preferably at least 30.0 wt.-%, yet more preferably at least 35.0 wt.-%, still yet more preferably at least 40.0 wt.-%, of a crystalline fraction having a lamella thickness of at least 24.2 nm, preferably of 24.2 to 84.6 nm, wherein said fraction is determined by the stepwise isothermal segregation technique (SIST).

As stated above the polypropylene (PP) is featured by a broad molecular weight distribution. This broad molecular weight distribution is preferably achieved by three polypropylene fractions within the polypropylene (PP), said polypropylene fractions differ in the weight average molecular weight (Mw).

Accordingly the polypropylene (PP) preferably comprises at least two, more preferably comprises two or three, yet more preferably consists of two or three, polypropylene fractions, the two or three polypropylene fractions differ from each other by the melt flow rate MFR$_2$ (230° C.) measured according to ISO 1133.

Preferably at least one of the polypropylene fractions is a propylene homopolymer, even more preferred all (two or three) polypropylene fractions are propylene homopolymers.

Thus in a preferred embodiment the matrix (M), i.e. the polypropylene (PP), of the heterophasic propylene copolymer (HECO) comprises (a) a first polypropylene fraction (PP1) being a first propylene homopolymer (H-PP1) or a first random propylene copolymer (R-PP1),
(b) a second polypropylene fraction (PP2) being a second propylene homopolymer (H—PP2) or a second random propylene copolymer (R-PP2),
(c) a third polypropylene fraction (PP3) being a third propylene homopolymer (H-PP3) or a third random propylene copolymer (R-PP3),
with the proviso that at least one of the three fractions PP1, PP2, and PP3 is a propylene homopolymer, preferably at least the first polypropylene fraction (PP1) is a propylene homopolymer, more preferably all three fractions PP1, PP2, and PP3 are propylene homopolymers.

Preferably the melt flow rate MFR$_2$ (230° C.) increases from the first polypropylene fraction (PP1) to the third polypropylene fraction (PP3). Accordingly the ratio between the melt flow rate MFR$_2$ (230° C.) of the third polypropylene fraction (PP3) and the first polypropylene fraction (PP1) [MFR(PP3)/MFR(PP1)] is preferably at least 20, more preferably at least 50 and/or the ratio between the melt flow rate MFR$_2$ (230° C.) of the third polypropylene fraction (PP3) and the second polypropylene fraction (PP2) [MFR(PP3)/MFR (PP2)] is preferably at least 8, more preferably at least 12.

In another preferred embodiment the melt flow rate MFR$_2$ (230° C.) increases from the first polypropylene fraction to the second polypropylene fraction (PP2) and from the second polypropylene fraction (PP2) to the third polypropylene fraction (PP3). Accordingly the second polypropylene fraction (PP2) has a higher melt flow rate MFR$_2$ (230° C.) than the first polypropylene fraction (PP1) but a lower melt flow rate MFR$_2$ (230° C.) than the third polypropylene fraction (PP3).

Thus the third polypropylene fraction (PP3) has the highest melt flow rate MFR$_2$ (230° C.) of the three polypropylenes fractions PP1, PP2, PP3, more preferably of all polymers present in the polypropylene (PP).

As mentioned above, it is in particular preferred that at least the first polypropylene fraction (PP1) is a propylene homopolymer, a so called first propylene homopolymer (H-PP1). Even more preferred this first polypropylene fraction (PP1) has the lowest melt flow rate MFR$_2$ (230° C.) of the three polypropylenes PP1, PP2, and PP3.

Still more preferred, in addition to the first polypropylene fraction (PP1) either the second polypropylene fraction (PP2) or the third polypropylene fraction (PP3) is a propylene homopolymer. In other words it is preferred that the polypropylene (PP) comprises, preferably consists of, only one polypropylene being a random propylene copolymer. Accordingly either the second polypropylene fraction (PP2) is a propylene homopolymer, so called second propylene homopolymer (H-PP2), or the third polypropylene fraction (PP3) is a propylene homopolymer, so called third propylene homopolymer (H-PP3).

It is especially preferred that all three polypropylene fractions, PP1, PP2, and PP3 are propylene homopolymers.

In the following the three polypropylene PP1, PP2, and PP3 will described in more detail.

As mentioned above the polypropylenes PP1, PP2, and PP3 can be random propylene copolymers or propylene homopolymers. In any case the comonomers content shall be rather low for each of the polypropylenes PP1, PP2, and PP3. Accordingly the comonomer content of each of the three polypropylenes PP1, PP2, and PP3 is not more than 1.0 wt.-%, yet more preferably not more than 0.8 wt.-%, still more preferably not more than 0.5 wt.-%. In case of the random propylene copolymers R-PP1, R-PP2, and R-PP3 it is appreciated that the comonomer content for each of the random propylene copolymers R-PP1, R-PP2, and R-PP3 is in the range of more than 0.2 to 1.0 wt.-%, more preferably in the range of more than 0.2 to 0.8 wt.-%, yet more preferably in the range of 0.2 to 0.7 wt.-%.

Concerning the comonomers used in the first random propylene copolymer (R-PP1), the second random propylene copolymer (R-PP2), and the third random propylene copolymer (R-PP3) it is referred to the information provided for the heterophasic propylene copolymer (HECO). Accordingly the R-PP1, R-PP2, and R-PP3 comprise independently from each other monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably R-PP1, R-PP2, and R-PP3 comprise independently from each other, especially consists independently from each other of, monomers copolymerizable with propylene from the group consisting of ethylene, 1-butene and 1-hexene. More specifically the R-PP1, R-PP2, and R-PP3 comprise independently from each other—apart from propylene—units derivable from ethylene and/or 1-butene. In a preferred embodiment the R-PP1, R-PP2, and R-PP3 have apart from propylene the same comonomers. Thus in an especially preferred embodiment the R-PP1, R-PP2, and R-PP3 comprise units derivable from ethylene and propylene only.

As stated above the first polypropylene (PP1) is a random propylene copolymer (R-PP1) or a propylene homopolymer (H-PP1), the latter being preferred.

The xylene cold soluble (XCS) content measured according to ISO 6427 (23° C.) of the first polypropylene (PP1) is preferably equal or below 5.0 wt.-%, more preferably equal or below 4.5 wt.-%, still more preferably in the range of 0.8 to 4.5 wt.-%, like in the range of 0.8 to 3.0 wt.-%.

As stated above the first polypropylene (PP1) is featured by rather low melt flow rate $MFR_2$ (230° C.). Accordingly it is appreciated that the melt flow rate $MFR_2$ (230° C.) measured according to ISO 1133 is of not more than 0.1 g/10 min, preferably of not more than 0.07 g/10 min, still more preferably in the range of 0.001 to 0.1, yet more preferably in the range of 0.004 to 0.07 g/10 min.

Alternatively or additionally the first polypropylene (PP1) is defined by a high molecular weight. Thus it appreciated that the first polypropylene (PP1) has a weight average molecular weight (Mw) measured by gel permeation chromatography (GPC; ISO 16014-4:2003) of at least 2,000 kg/mol, more preferably of at least 5,000 kg/mol, yet more preferably in the range of 2,000 to 50,000 kg/mol, still more preferably in the range of 5,000 to 20,000 kg/mol.

The second polypropylene (PP2) can be either a random propylene copolymer (second random propylene copolymer (R-PP2)) or a propylene homopolymer (a second propylene homopolymer (H-PP2)), the latter being preferred.

The xylene cold soluble (XCS) content measured according to ISO 6427 (23° C.) of the second polypropylene (PP2) is preferably equal or below 4.0 wt.-%, more preferably equal or below 3.5 wt.-%, still more preferably equal or below 3.0 wt.-%.

As stated above the second polypropylene (PP2) has a melt flow rate $MFR_2$ (230° C.) being lower than the third polypropylene (PP3). On the other hand the melt flow rate $MFR_2$ (230° C.) of the first polypropylene (PP1) can be lower or equally the same, preferably lower, as the melt flow rate $MFR_2$ (230° C.) of the second polypropylene (PP2). Accordingly it is appreciated that the second polypropylene (PP2) has melt flow rate $MFR_2$ (230° C.) measured according to ISO 1133 in the range of 0.005 to 2.0 g/10 min, preferably in the range of 0.008 to 1.5 g/10 min, like in the range of 0.008 to 1.0 g/10 min.

Alternatively or additionally the second polypropylene (PP2) is defined by a high molecular weight. Thus it appreciated that the second polypropylene (PP2) has a weight average molecular weight (Mw) measured by gel permeation chromatography (GPC; ISO 16014-4:2003) of at least 500 kg/mol, more preferably of at least 800 kg/mol, yet more preferably in the range of 500 to 4,000 kg/mol, still more preferably in the range of 750 to 3,500 kg/mol.

Preferably the weight ratio between the first polypropylene (PP1) and the second polypropylene (PP2) is 82:18 to 25:75, more preferably 80:20 to 30:70.

The third polypropylene (PP3) can be either a random propylene copolymer (third random propylene copolymer (R-PP3)) or a propylene homopolymer (a third propylene homopolymer (H-PP3)), the latter being preferred.

The xylene cold soluble (XCS) content measured according to ISO 6427 (23° C.) of the third polypropylene (PP3) is preferably equal or below 4.5 wt.-%, more preferably equal or below 3.5 wt.-%, still more preferably below 2.5 wt.-%.

As stated above the third polypropylene (PP3) has preferably the highest melt flow rate $MFR_2$ (230° C.) of the three polypropylenes PP1. PP2, and PP3, more preferably the highest melt flow rate $MFR_2$ (230° C.) of the polymers present in the polypropylene (PP). Accordingly it is appreciated that the third polypropylene (PP3) has melt flow rate $MFR_2$ (230° C.) measured according to ISO 1133 of at least 4.0 g/10 min, more preferably of at least 8.0 g/10 min, yet more preferably in the range of 4.0 to 100 g/10 min.

Alternatively or additionally the third polypropylene (PP3) is defined by its weight average molecular weight (Mw). Thus it appreciated that the third polypropylene (PP3) has a weight average molecular weight (Mw) measured by gel permeation chromatography (GPC; ISO 16014-4:2003) of not more than 800 kg/mol, more preferably of not more than 700 kg/mol, yet more preferably in the range of 100 to 800 kg/mol.

Very good results are achievable in case the polypropylene (PP) comprises
(a) 15.0 to 35.0 wt.-%, preferably 16.0 to 32.0 wt.-%, of the first polypropylene (PP1),
(b) 29.0 to 48.0 wt.-%, preferably 31.0 to 45.0 wt.-%, of the second polypropylene (PP2), and
(c) 18.0 to 55.0 wt.-%, preferably 20.0 to 51.0 wt.-%, of the third polypropylene (PP3), based on the total amount of the first polypropylene (PP1), the second polypropylene (PP2), and the third polypropylene (PP3).

Preferably the polypropylene (PP) is produced in a sequential polymerization process, preferably as described in detail below. Accordingly the three polypropylenes PP1, PP2, and PP3 are an intimate mixture, which is not obtainable by mechanical blending.

A further essential component of the heterophasic propylene copolymer (HECO) is the elastomeric propylene copolymer (EC) dispersed in the matrix, i.e. in the polypropylene (PP). Concerning the comonomers used in the elastomeric propylene copolymer (EC) it is referred to the information provided for the heterophasic propylene copolymer (HECO). Accordingly the elastomeric propylene copolymer (EC) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (EC) comprises, especially consists of, monomers copolymerizable with propylene from the group consisting of ethylene, 1-butene and 1-hexene. More specifically the elastomeric propylene copolymer (EC) comprises—apart from propylene—units derivable from ethylene and/or 1-butene. Thus in an especially preferred embodiment the elastomeric propylene copolymer (EC) comprises units derivable from ethylene and propylene only.

The properties of the elastomeric propylene copolymer (EC) mainly influences the xylene cold soluble (XCS) content as well as the amorphous phase (AM) of the final heterophasic propylene copolymer (HECO). Thus according to the present invention the amorphous phase (AM) of the heterophasic propylene copolymer (HECO) is regarded as the elastomeric propylene copolymer (EC) of the heterophasic propylene copolymer (HECO).

Accordingly one important requirement of the present invention is that the elastomeric propylene copolymer (EC) has a rather high weight average molecular weight. High intrinsic viscosity (IV) values reflect a high weight average molecular weight. Thus it is appreciated that the amorphous phase (AM) of the xylene cold soluble fraction (XCS) of the heterophasic propylene copolymer (HECO) has an intrinsic viscosity (IV) measured according to ISO 1628-1 (at 135° C. in decaline) of at least 3.5 dl/g, more preferably of at least 4.0 dl/g, still more preferably in the range of 3.5 to 6.0 dl/g, like in the range of 3.8 to 5.0 dl/g.

The comonomer content, preferably the ethylene content, within the elastomeric propylene copolymer (EC) is comparatively low. Accordingly in a preferred embodiment the comonomer content, more preferably ethylene content, of the amorphous phase (AM) of the xylene cold soluble fraction (XCS) of the heterophasic propylene copolymer (HECO) is below 40.0 wt.-%, more preferably below 37.0 wt.-%, yet more preferably in the range of 25.0 to 40.0 wt.-%, like 30.0 to 38.0 wt.-%.

The heterophasic propylene copolymer (HECO) according to this invention preferably comprises (a) 80.0 to 94.0 wt.-%, more preferably 83.0 to 94.0 wt.-%, of the polypropylene (PP), and (b) 6.0 to 20.0 wt.-%, more preferably 6.0 to 17.0 wt.-%, of the elastomeric copolymer (EC), based on the total amount of the polypropylene (PP) and the elastomeric copolymer (EC), wherein the amount of the elastomeric copolymer (EC) corresponds to the amount of the amorphous fraction (AM) of the xylene cold soluble (XCS) fraction.

Finally the heterophasic propylene copolymer (HECO) of the instant invention is preferably featured by (i) a tensile modulus measured according to ISO 527-2 of at least 1400 MPa, more preferably of at least 1600 MPa, and/or (ii) a charpy notched impact strength measured according to ISO 179 (1 eA; 23° C.) of at least 30 kJ/m$^2$, preferably of at least 45 kJ/m$^2$.

The heterophasic propylene copolymer (HECO) as defined in the instant invention may contain up to 2.0 wt.-% additives, like nucleating agents and antioxidants, as well as slip agents.

The instant invention is also directed to the use of the heterophasic propylene copolymer (HECO) for a pipe, like a non-pressure pipe, or for parts of a pipe, like a non-pressure pipe, and for the manufacture of pipes. It is furthermore directed to the use of the heterophasic propylene copolymer (HECO) for sheets, profiles and fittings, like fittings for non-pressure pipes.

Furthermore, the present invention relates to sheets, profiles, fittings, and pipes, like pipe fittings, in particular non-pressure pipes, comprising, preferably comprising at least 75 wt.-%, more preferably comprising at least 90 wt.-%, like at least 95 wt.-%, most preferably consists of, a heterophasic propylene copolymer (HECO) as defined in the instant invention.

The term "pipe" as used herein is meant to encompass hollow articles having a length greater than diameter. Moreover the term "pipe" shall also encompass supplementary parts like fittings, valves and all parts which are commonly necessary for e.g. a indoor soil and waste or underground sewage piping system.

Pipes according to the invention encompass solid wall pipes and structured wall pipes. Solid wall pipes can be single layer pipes or multilayer pipes, however it is preferred that the solid wall pipe is a single layer pipe. Structured wall pipes preferably consist of two layers, one of which is a smooth inner layer while the other is a corrugated, spiral wound or ribbed outer layer. More preferably the inventive composition is comprised in at least one of the layers of such a structured wall pipe.

The heterophasic propylene copolymer (HECO) used for pipes according to the invention may contain usual auxiliary materials, e.g. up to 10 wt.-% fillers and/or 0.01 to 2.5 wt.-% stabilizers and/or 0.01 to 10 wt.-% processing aids and/or 0.1 to 1.0 wt.-% antistatic agents and/or 0.2 to 3.0 wt.-% pigments and/or reinforcing agents, e.g. glass fibres, in each case based on the heterophasic propylene copolymer (HECO) used (the wt.-% given in this paragraph refer to the total amount of the pipe and/or a pipe layer comprising said heterophasic propylene copolymer (HECO)).

The heterophasic propylene copolymer (HECO) as defined above is preferably produced by a sequential polymerization process as defined below.

Accordingly the present invention is directed to a sequential polymerization process for producing a heterophasic propylene copolymer (HECO) according to the instant invention, said heterophasic propylene copolymer (HECO) comprises a first polypropylene (PP1), a second polypropylene (PP2) and a third polypropylene (PP3), wherein said process comprises the steps of (a1) polymerizing propylene and at least one ethylene and/or optionally at least one $C_4$ to $C_{12}$ α-olefin in a first reactor (R1) obtaining the first polypropylene (PP1), preferably said first polypropylene (PP1) is a first propylene homopolymer (H-PP1), (b1) transferring the first polypropylene (PP1) in a second reactor (R2), (c1) polymerizing in the second reactor (R2) and in the presence of said first polypropylene (PP1) propylene and optionally at least one ethylene and/or a $C_4$ to $C_{12}$ α-olefin obtaining thereby the second polypropylene (PP2), preferably said second polypropylene (PP2) is a second propylene homopolymer (H-PP2), the first polypropylene (PP1) being mixed with the second polypropylene (PP2), (d1) transferring the mixture of step (c1) in a third reactor (R3), (e1) polymerizing in the third reactor (R3) and in the presence of the mixture obtained in step (c1) propylene and optionally at least one ethylene and/or a $C_4$ to $C_{12}$ α-olefin obtaining thereby a third polypropylene (PP3), preferably said third polypropylene (PP3) is a third propylene homopolymer (H-PP3), the first polypropylene (PP1), the second polypropylene (PP2) and the third polypropylene (PP3) form the polypropylene (PP), (f1) transferring the polypropylene (PP) in a fourth reactor (R4), and (g1) polymerizing in the fourth reactor (R4) and in the presence of the polypropylene (PP) propylene and at least one ethylene and/or a $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO), or (a2) polymerizing propylene and at least one ethylene and/or a C4 to C20 α-olefin in a first reactor (R1) obtaining the second polypropylene (PP2), preferably said second polypropylene (PP2) is a second propylene homopolymer (H-PP2), (b2) transferring the second polypropylene (PP2) in a second reactor (R2), (c2) polymerizing in the second reactor (R2) and in the presence of said second polypropylene (PP2) propylene and optionally at least one ethylene and/or a $C_4$ to $C_{12}$ α-olefin obtaining thereby the third polypropylene (PP3), preferably said third polypropylene (PP3) is a third propylene homopolymer (H-PP3), the second polypropylene (PP2) being mixed with the third polypropylene (PP3), (d2) transferring the mixture of step (c2) in a third reactor (R3), (e2) polymerizing in the third reactor (R3) and in the presence of the mixture obtained in step (c2) propylene and optionally at least one ethylene and/or a $C_4$ to $C_{12}$ α-olefin obtaining thereby a first polypropylene (PP1), preferably said first polypropylene (PP1) is a first propylene homopolymer (H-PP1), the first polypropylene (PP1), the second polypropylene (PP2) and the third polypropylene (PP3) form the polypropylene (PP), (f2) transferring the polypropylene (PP) in a fourth reactor (R4), and (g2) polymerizing in the fourth reactor (R4) and in the presence of the polypropylene (PP) propylene and at least one ethylene and/or a $C_4$ to $C_{12}$ α-olefin obtaining thereby a elastomeric propylene copolymer (EC), the polypropylene (PP) and the elastomeric propylene copolymer (EC) form the heterophasic propylene copolymer (HECO).

Preferably between the second reactor (R2) and the third reactor (R3) and optionally between the third reactor (R3) and fourth reactor (R4) the monomers are flashed out.

For preferred embodiments of the heterophasic propylene copolymer (HECO), the polypropylene (PP), the first polypropylene (PP1), the second polypropylene (PP2), and the third polypropylene (PP3), as well as for the elastomeric copolymer (EC) reference is made to the definitions given above.

The term "sequential polymerization process" indicates that the polypropylene is produced in at least four reactors connected in series. Accordingly the present process comprises at least a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the random propylene copolymer (R-PP) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-4), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

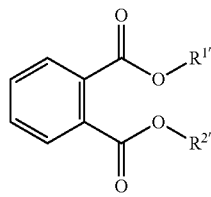

(I)

wherein $R^{1'}$ and $R^{2'}$ are independently at least a $C_5$ alkyl
under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl, or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

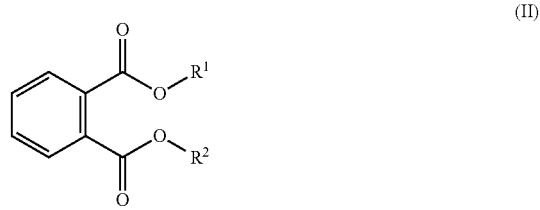

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \qquad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is selected from the group consisting of diethylaminotriethoxysilane [Si (OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

In a further embodiment, the Ziegler-Natta procatalyst can be modified by polymerising a vinyl compound in the presence of the catalyst system, comprising the special Ziegler-Natta procatalyst (component (i)), an external donor (component (iii)) and optionally a cocatalyst (component (iii)), which vinyl compound has the formula:

$$CH_2=CH—CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The additives as stated above are added afterwards to the heterophasic propylene copolymer (HECO), which is collected from the final reactor of the series of reactors. Preferably, these additives are mixed into the composition prior to or during the extrusion process in a one-step compounding process. Alternatively, a master batch may be formulated, wherein the heterophasic propylene copolymer (HECO) is first mixed with only some of the additives.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate articles, like pipes, of the inventive heterophasic propylene copolymer (HECO).

The heterophasic propylene copolymer (HECO) according to the invention may be pelletized and compounded using any of the variety of compounding and blending methods well known and commonly used in the resin compounding art.

In the following the present invention is further illustrated by means of examples.

EXAMPLES

A. Measuring Methods

The following definitions of terms and determination methods apply for the above general description of the invention as well as to the below examples unless otherwise defined.

Calculation of comonomer content of the second polypropylene (PP2):

$$\frac{C(R2) - w(PP1) \times C(PP1)}{w(PP2)} = C(PP2) \qquad (I)$$

wherein w(PP1) is the weight fraction of the first polypropylene (PP1), i.e. the product of the first reactor (R1), w(PP2) is the weight fraction of the second polypropylene (PP2), i.e. of the polymer produced in the second reactor (R2), C(PP1) is the comonomer content [in wt.-%] measured by Fourier transform infrared spectroscopy (FTIR) of the first polypropylene (PP1), i.e. of the product of the first reactor (R1), C(R2) is the comonomer content [in wt.-%] measured by Fourier transform infrared spectroscopy (FTIR) of the product obtained in the second reactor (R2), i.e. the mixture of the first polypropylene (PP1) and the second polypropylene (PP2), C(PP2) is the calculated comonomer content [in wt.-%] of the second polypropylene (PP2).

Calculation of the xylene cold soluble (XCS) content of the second polypropylene (PP2):

$$\frac{XS(R2) - w(PP1) \times XS(PP1)}{w(PP2)} = XS(PP2) \qquad (II)$$

wherein w(PP1) is the weight fraction of the first polypropylene (PP1), i.e. the product of the first reactor (R1), w(PP2) is the weight fraction of the second polypropylene (PP2), i.e. of the polymer produced in the second reactor (R2), XS(PP1) is the xylene cold soluble (XCS) content [in wt.-%] as determined at 23° C. according to ISO 6427 of the first polypropylene (PP1), i.e. of the product of the first reactor (R1), XS(R2) is the xylene cold soluble (XCS) content [in wt.-%] as determined at 23° C. according to ISO 6427 of the product obtained in the second reactor (R2), i.e. the mixture of the first polypropylene (PP1) and the second polypropylene (PP2), XS(PP2) is the calculated xylene cold soluble (XCS) content [in wt.-%] of the second polypropylene (PP2).

Calculation of melt flow rate MFR$_2$ (230° C.) of the second polypropylene (PP2):

$$MFR(PP2) = 10^{\left[\frac{\log(MFR(R2)) - w(PP1) \times \log(MFR(PP1))}{w(PP2)}\right]} \qquad (I)$$

wherein
w(PP1) is the weight fraction of the first polypropylene (PP1), i.e. the product of the first reactor (R1),
w(PP2) is the weight fraction of the second polypropylene (PP2), i.e. of the polymer produced in the second reactor (R2),
MFR(PP1) is the melt flow rate $MFR_2$ (230° C.) [in g/10 min] measured according ISO 1133 of the first polypropylene (PP1), i.e. of the product of the first reactor (R1),
MFR(R2) is the melt flow rate $MFR_2$ (230° C.) [in g/10 min] measured according ISO 1133 of the product obtained in the second reactor (R2), i.e. the mixture of the first polypropylene (PP1) and the second polypropylene (PP2),
MFR(PP2) is the calculated melt flow rate $MFR_2$ (230° C.) [in g/10 min] of the second polypropylene (PP2).

Calculation of comonomer content of the third polypropylene (PP3):

$$\frac{C(R3) - w(R2) \times C(R2)}{w(PP3)} = C(PP3) \quad (IV)$$

wherein
w(R2) is the weight fraction of the second reactor (R2), i.e. the mixture of the first polypropylene (PP1) and the second polypropylene (PP2),
w(PP3) is the weight fraction of the third polypropylene (PP3), i.e. of the polymer produced in the third reactor (R3),
C(R2) is the comonomer content [in wt.-%] measured by Fourier transform infrared spectroscopy (FTIR) of the product of the second reactor (R2), i.e. of the mixture of the first polypropylene (PP1) and second polypropylene (PP2),
C(R3) is the comonomer content [in wt.-%] measured by Fourier transform infrared spectroscopy (FTIR) of the product obtained in the third reactor (R3), i.e. the mixture of the first polypropylene (PP1), the second polypropylene (PP2), and the third polypropylene (PP3),
C(PP3) is the calculated comonomer content [in wt.-%] of the third polypropylene (PP3).

Calculation of xylene cold soluble (XCS) content of the third polypropylene (PP3):

$$\frac{XS(R3) - w(R2) \times XS(R2)}{w(PP3)} = XS(PP3) \quad (V)$$

wherein
w(R2) is the weight fraction of the second reactor (R2), i.e. the mixture of the first polypropylene (PP1) and the second polypropylene (PP2),
w(PP3) is the weight fraction of the third polypropylene (PP3), i.e. of the polymer produced in the third reactor (R3),
XS(R2) is the xylene cold soluble (XCS) content [in wt.-%] as determined at 23° C. according to ISO 6427 of the product of the second reactor (R2), i.e. of the mixture of the first polypropylene (PP1) and second polypropylene (PP2),
XS(R3) is the xylene cold soluble (XCS) content [in wt.-%] as determined at 23° C. according to ISO 6427 of the product obtained in the third reactor (R3), i.e. the mixture of the first polypropylene (PP1), the second polypropylene (PP2), and the third polypropylene (PP3),
XS(PP3) is the calculated xylene cold soluble (XCS) content [in wt.-%] of the third polypropylene (PP3).

Calculation of melt flow rate $MFR_2$ (230° C.) of the third polypropylene (PP3):

$$MFR(PP3) = 10^{\left[\frac{\log(MFR(R3)) - w(R2) \times \log(MFR(R2))}{w(PP3)}\right]} \quad (II)$$

wherein
w(R2) is the weight fraction of the second reactor (R2), i.e. the mixture of the first polypropylene (PP1) and the second polypropylene (PP2),
w(PP3) is the weight fraction of the third polypropylene (PP3), i.e. of the polymer produced in the third reactor (R3),
MFR(R2) is the melt flow rate $MFR_2$ (230° C.) [in g/10 min] measured according ISO 1133 of the product of the second reactor (R2), i.e. of the mixture of the first polypropylene (PP1) and second polypropylene (PP2),
MFR(R3) is the melt flow rate $MFR_2$ (230° C.) [in g/10 min] measured according ISO 1133 of the product obtained in the third reactor (R3), i.e. the mixture of the first polypropylene (PP1), the second polypropylene (PP2), and the third polypropylene (PP3),
MFR(PP3) is the calculated melt flow rate $MFR_2$ (230° C.) [in g/10 min] of the third polypropylene (PP3).

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mmmm pentad concentration in a manner well known in the art.

Randomness

In the FTIR measurements, films of 250-mm thickness were compression moulded at 225° C. and investigated on a Perkin-Elmer System 2000 FTIR instrument. The ethylene peak area (760-700 $cm^{-1}$) was used as a measure of total ethylene content. The absorption band for the structure -P-E-P- (one ethylene unit between propylene units), occurs at 733 $cm^{-1}$. This band characterizes the random ethylene content. For longer ethylene sequences (more than two units), an absorption band occurs at 720 $cm^{-1}$. Generally, a shoulder corresponding to longer ethylene runs is observed for the random copolymers. The calibration for total ethylene content based on the area and random ethylene (PEP) content based on peak height at 733 $cm^{-1}$ was made by $^{13}C^-$NMR. (Thermochimica Acta, 66 (1990) 53-68).

Number Average Molecular Weight ($M_n$), Weight Average Molecular Weight ($M_w$) and Molecular Weight Distribution (MWD) are Determined by Gel Permeation Chromatography (GPC) According to the Following Method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl- 4-methyl-phenol) as solvent at 145° C. and at a constant flow rate of 1 mL/min 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology:

Dynamic rheological measurements were carried out with Rheometrics RDA-II QC on compression molded samples under nitrogen atmosphere at 200° C. using 25 mm-diameter plate and plate geometry. The oscillatory shear experiments were done within the linear viscoelastic range of strain at frequencies from 0.01 to 500 rad/s. (ISO 6721-10) The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the Following Equations $$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)*\omega/[G'(\omega)^2+G''(\omega)^2]$$

The Polydispersity Index, PI,

PI=$10^5$/Gc, is calculated from the cross-over point of G'($\omega$) and G"($\omega$), for which G'($\omega$c)=G"($\omega$c)=Gc holds.

Shear thinning indexes (SHI), which are correlating with MWD and are independent of MW, were calculated according to Heino[1,2] (below). The SHI (3/100) is defined as the ratio of the complex viscosity at 200° C. and a shear stress of 3 kPa ($\eta^*3$) and the complex viscosity at 200° C. and a shear stress of 100 kPa ($\eta^*100$).

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362
2) The influence of molecular structure on some rheological properties of polyethylene. Heino, Eeva-Leena. Borealis Polymers Oy, Porvoo, Finland. Annual Transactions of the Nordic Rheology Society, 1995

Crossover Frequency $\omega$c

The crossover frequency $\omega$c is determined from the crossover point of G'($\omega$) and G"($\omega$), for which G'($\omega$c)=G"($\omega$c)=Gc holds.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

Comonomer Content

The comonomer contents of the copolymer was determined by quantitative Fourier transform infrared spectroscopy (FTIR) calibrated to results obtained from quantitative $^{13}$C NMR spectroscopy.

Thin films were pressed to a thickness of between 300 to 500 μm at 190° C. and spectra recorded in transmission mode. Relevant instrument settings include a spectral window of 5000 to 400 wave-numbers (cm$^{-1}$), a resolution of 2.0 cm$^{-1}$ and 8 scans.

The butene content of a propylene-butene copolymer was determined using the baseline corrected peak maxima of a quantitative band at 767 cm$^{-1}$, with the baseline defined from 780-750 cm$^{-1}$.

The hexene content of a propylene-hexene copolymer was determined using the baseline corrected peak maxima of a quantitative band at 727 cm$^{-1}$, with the baseline defined from 758.5 to 703.0 cm$^{-1}$)

The comonomer content C was determined using a film thickness method using the intensity of the quantitative band I(q) and the thickness of the pressed film T using the following relationship: $[I(q)/T]_m+c=C$ where m and c are the coefficients determined from the calibration curve constructed using the comonomer contents obtained from $^{13}$C NMR spectroscopy.

Xylene Cold Soluble Fraction (XCS wt-%)

The xylene cold soluble fraction (XCS) is determined at 23° C. according to ISO 6427.

The amorphous content (AM) is measured by separating the above xylene cold soluble fraction (XCS) and precipitating the amorphous part with acetone. The precipitate was filtered and dried in a vacuum oven at 90° C.

$$AM \% = \frac{100 \times m1 \times v0}{m0 \times v1}$$

wherein

"AM %" is the amorphous fraction,
"m0" is initial polymer amount (g)
"m1" is weight of precipitate (g)
"v0" is initial volume (ml)
"v1" is volume of analyzed sample (ml)

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.
(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

The melting curve of the material crystallised this way can be used for calculating the lamella thickness distribution according to Thomson-Gibbs equation (Eq 1.).

$$T_m = T_0 \left(1 - \frac{2\sigma}{\Delta H_0 \cdot L}\right) \quad (1)$$

where $T_0 = 457K$, $\Delta H_0 = 134 \times 10^6 \, J/m^3$, $\sigma = 49.6 \times 10^{-3} \, J/m^3$ and L is the lamella thickness.

Tensile Modulus is measured according to ISO 527-2 (cross head speed=50 mm/min; 23° C.) using injection molded specimens as described in EN ISO 1873-2 (dog bone shape, 4 mm thickness).

Charpy notched impact strength is determined according to ISO 179/1 eA at 23° C., at 0° C. and at −20° C. by using injection moulded test specimens as described in EN ISO 1873-2 (80×10×4 mm).

B. Examples

All polymers were produced in a Borstar pilot plant with a prepolymerization reactor, one slurry loop reactor and three gas phase reactors. The catalyst Polytrack 8502, commercially available from Grace (US) was used in combination with diethylaminotriethoxysilane [Si(OCH$_2$CH$_3$)$_3$(N(CH$_2$CH$_3$)$_2$)] as external donor and triethylaluminium (TEAL) as activator and scavenger in the ratios indicated in table 1. The "dynamic hydrogen feed" indicated in table 1 for the loop reactor was achieved by pulse feeding of hydrogen to the prepolymerization reactor in intervals of 30 min with a pulse duration of 5 min, resulting in a variation of the effective H2/C3 ratio in the loop reactor between 25 and 110 mol/mol in a sawtooth function with a period of 30 min.

TABLE 1

Preparation of the heterophasic propylene copolymers (HECO)

| Parameter | unit | IE 1 | IE 2 | CE 1 | CE 2 |
|---|---|---|---|---|---|
| Prepolymerization | | | | | |
| temperature | [° C.] | 35 | 35 | 35 | 35 |
| pressure | [kPa] | 5100 | 5200 | 5100 | 5200 |
| Al/donor ratio | [mol/mol] | 4 | 4 | 4 | 4 |
| residence time | [h] | 0.3 | 0.3 | 0.3 | 0.3 |
| Loop | | | | | |
| temperature | [° C.] | 85 | 85 | 70 | 70 |
| pressure | [kPa] | 5500 | 5400 | 5400 | 5400 |
| residence time | [h] | 0.14 | 0.17 | 0.2 | 0.3 |
| ethylene feed | [kg/h] | 0 | 0 | 2 | 2.3 |
| H2/C3 ratio | [mol/kmol] | dyn. H$_2$-feed | dyn. H$_2$-feed | dyn. H$_2$-feed | dyn. H$_2$-feed |
| GPR 1 | | | | | |
| temperature | [° C.] | 80 | 80 | 80 | 80 |
| pressure | [kPa] | 2100 | 2100 | 2100 | 2250 |
| residence time | [h] | 2.2 | 2.3 | 2.2 | 2.1 |
| ethylene feed | [kg/h] | 0 | 0 | 0 | 0 |
| H2/C3 ratio | [mol/kmol] | 49 | 3.1 | 3.4 | 5.5 |
| C2/C3 ratio | [mol/kmol] | 0 | 0 | 8.3 | 8.9 |

TABLE 1-continued

Preparation of the heterophasic propylene copolymers (HECO)

| Parameter | unit | IE 1 | IE 2 | CE 1 | CE 2 |
|---|---|---|---|---|---|
| GPR 2 | | | | | |
| temperature | [° C.] | 85 | 85 | 85 | 85 |
| pressure | [kPa] | 3200 | 3200 | 3200 | 3200 |
| residence time | [h] | 2.9 | 2.6 | 2.5 | 2.6 |
| ethylene feed | [kg/h] | 0.13 | 0.11 | 0.07 | 0.08 |
| H2/C3 ratio | [mol/mol] | 0.03 | 71 | 60 | 77 |
| C2/C3 ratio | [mol/kmol] | 0 | 0 | 0 | 0 |
| GPR 3 | | | | | |
| temperature | [° C.] | 70 | 75 | 75 | 75 |
| pressure | [kPa] | 2100 | 2200 | 2200 | 2200 |
| residence time | [h] | 0.7 | 0.9 | 0.6 | 0.8 |
| ethylene feed | [kg/h] | 27 | 27 | 27 | 27 |
| H2/C2 ratio | [mol/kmol] | 21 | 22 | 21 | 19 |
| C2/C3 ratio | [mol/kmol] | 538 | 550 | 568 | 545 |

TABLE 2

Properties of the heterophasic propylene copolymers (HECO) Loop, GPR1, GPR2

| | | IE 1 | IE 2 | CE 1 | CE 2 |
|---|---|---|---|---|---|
| Loop | | | | | |
| split | [wt.-%] | 41 | 39.9 | 43 | 49.4 |
| MFR$_2$ | [g/10 min] | 0.02 | 0.02 | 0.01 | 0.01 |
| C2 | [wt.-%] | — | — | 3.6 | 4.0 |
| XCS | [wt.-%] | 2.4 | 2.5 | 5.9 | 7 |
| GPR1 | | | | | |
| split | [wt.-%] | 59 | 60.1 | 57 | 50.6 |
| MFR$_2$ of PP made in GPR1 | [g/10 min] | 21 | 0.6 | 1.1 | 5 |
| MFR$_2$ of GPR1 | [g/10 min] | 1.04 | 0.14 | 0.14 | 0.21 |
| C2 of GPR1 | [wt.-%] | — | — | 1.7 | 1.9 |
| XCS of PP made in GPR1 | [wt.-%] | 0.54 | 0.67 | 0.64 | 1.06 |
| XCS of GPR1 | [wt.-%] | 1.3 | 1.4 | 2.9 | 2.9 |
| GPR2 | | | | | |
| split | [wt.-%] | 18.6 | 29.1 | 27.5 | 25.6 |
| MFR$_2$ made in GPR2 | [g/10 min] | 0.005 | 9.6 | 3.9 | 0.42 |
| MFR$_2$ of GPR2 | [g/10 min] | 0.38 | 0.48 | 0.35 | 0.25 |
| C2 of GPR2 | [wt.-%] | — | — | 1.33 | 1.47 |
| XCS of PP made in GPR2 | [wt.-%] | 1.42 | 0.98 | 2.62 | 2.16 |
| XCS of GPR2 | [wt.-%] | 1.4 | 1.1 | 2.7 | 2.5 |

TABLE 3

Properties of the heterophasic propylene copolymers (HECO); GPR3, Matrix (Loop, GPR1, GPR2), Final

| | | IE 1 | IE 2 | CE 1 | CE 2 |
|---|---|---|---|---|---|
| GPR3 | | | | | |
| split | | 9.3 | 6.4 | 7.9 | 8.5 |
| IV (AM) | [dl/g] | 4.2 | 4 | 4.2 | 4.7 |
| C2 (AM) | [wt.-%] | 32.9 | 34.6 | 34.5 | 33.4 |
| C2 of GPR3 | [wt.-%] | 3.9 | 3.3 | 5 | 5.2 |
| final XS | [wt.-%] | 11.4 | 9.8 | 11.7 | 12.3 |
| final AM | [wt.-%] | 10.7 | 9.1 | 10.9 | 10.8 |
| final MFR | [g/10 min] | 0.34 | 0.42 | 0.32 | 0.23 |
| Matrix | | | | | |
| MFR$_2$ | [g/10 min] | 0.5 | 0.6 | 0.5 | 0.4 |
| Tm | [° C.] | 169 | 168 | 162 | 161 |
| Tc | [° C.] | 128 | 128 | 125 | 125 |
| Tensile modulus | [MPa] | 2224 | 2254 | 1783 | 1700 |
| Mn | [kg/mol] | 88 | 86 | 92 | 80 |
| Mw | [kg/mol] | 643 | 628 | 637 | 844 |

TABLE 3-continued

Properties of the heterophasic propylene copolymers
(HECO); GPR3, Matrix (Loop, GPR1, GPR2), Final

|  |  | IE 1 | IE 2 | CE 1 | CE 2 |
|---|---|---|---|---|---|
| $\omega_c$ | [rad/s] | 0.9 | 2 | 1.4 | 0.7 |
| PI |  | — | 7.9 | 6.2 | 7.9 |
| SHI (3/100) |  | — | 85 | 53 | 84 |

Total

|  |  | IE 1 | IE 2 | CE 1 | CE 2 |
|---|---|---|---|---|---|
| $\omega_c$ | [rad/s] | 0.57 | 1.8 | 1.0 | 0.65 |
| PI |  | 8.3 | 5.5 | 5.9 | 6.5 |
| SHI (3/100) |  | 95 | 40 | 46 | 60 |
| Tm | [° C.] | 168 | 169 | 162 | 161 |
| Tc | [° C.] | 129 | 129 | 125 | 125 |
| Tensile modulus | [MPa] | 1790 | 1900 | 1420 | 1400 |
| NIS (23° C.) | [kJ/m$^2$] | 61 | 50 | 17.8 | 48.3 |
| NIS (0° C.) | [kJ/m$^2$] | 10 | 8.2 | 6 | 6.1 |
| NIS (−20° C.) | [kJ/m$^2$] | 5.9 | 5.4 | 6 | 6.1 |

TABLE 3

SIST Properties

| T Range [° C.] | Lc range [nm] | IE 1 Fraction [wt.-%] | IE 2 Fraction [wt.-%] | CE 1 Fraction [wt.-%] | CE 2 Fraction [wt.-%] |
|---|---|---|---|---|---|
| 50-60 | 2.52-2.73 | 0.0 | 0.1 | 0.2 | 0.1 |
| 60-70 | 2.74-2.97 | 0.0 | 0.2 | 0.0 | 0.4 |
| 70-80 | 2.98-3.25 | 0.0 | 0.3 | 0.4 | 0.7 |
| 80-90 | 3.26-3.60 | 0.0 | 0.3 | 0.7 | 1.1 |
| 90-100 | 3.61-4.03 | 0.0 | 0.3 | 0.8 | 1.4 |
| 100-110 | 4.04-4.57 | 0.0 | 0.3 | 0.8 | 1.4 |
| 110-120 | 4.58-5.28 | 0.2 | 0.4 | 1.7 | 2.3 |
| 120-130 | 5.29-6.26 | 0.6 | 0.8 | 3.4 | 4.3 |
| 130-140 | 6.27-7.69 | 1.6 | 1.6 | 5.6 | 7.1 |
| 140-150 | 7.70-9.95 | 4.0 | 3.9 | 9.9 | 11.5 |
| 150-160 | 9.96-14.09 | 13.0 | 12.7 | 19.7 | 21.2 |
| 160-170 | 14.09-24.16 | 37.0 | 36.2 | 41.7 | 40.2 |
| 170-180 | 24.16-84.55 | 42.9 | 42.1 | 15.2 | 8.3 |
| >180 | >84.55 | 0.8 | 0.7 | 0.0 | 0.0 |

The invention claimed is:

1. Heterophasic propylene copolymer (HECO) comprising:
   (a) a matrix (M) being a polypropylene (PP), said polypropylene (PP) has a polydispersity index (PI) of at least 5.0, and
   (b) an elastomeric propylene copolymer (EC) dispersed in said matrix (M), wherein
      (i) said heterophasic propylene copolymer (HECO) has a melt flow rate MFR$_2$ (230° C.) measured according to ISO 1133 of equal or below 1.0 g/10 min,
      (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) in the range of 3.8 to 6.0 dl/g and a comonomer content in the range of 25.0 to 40.0 wt. %, and wherein the polypropylene (PP) comprises at least three polypropylene fractions, the three polypropylene fractions differ from each other by the melt flow rate MFR2 (230° C.) measured according to ISO 1133 and at least one of the three polypropylenes is a propylene homopolymer and the remaining two polypropylenes are either a homopolymer or a copolymer.

2. Heterophasic propylene copolymer (HECO) according to claim 1, wherein the heterophasic propylene copolymer (HECO) has
   (i) a polydispersity index (PI) of at least 4.5, and/or
   (ii) a shear thinning index SHI (3/100) measured according to ISO 6271-10 (200° C.) of at least 25.0, and/or
   (iii) a crossover frequency $\omega_c$ measured according to ISO 6271-10 (200° c.) of equal or below 3.0 rad/s.

3. Heterophasic propylene copolymer (HECO) according to claim 1, wherein the heterophasic propylene copolymer (HECO) has:
   (i) a comonomer content in the range of 2.0 to 14.0 wt. %, and/or
   (ii) a xylene cold soluble (XCS) fraction measured according to ISO6427 (23° C.) of below 15.0 wt. %.

4. Heterophasic propylene copolymer (HECO) according to claim 1, wherein the heterophasic propylene copolymer (HECO) has:
   (i) a melting temperature Tm of at least 158° C., and/or
   (ii) a crystallization temperature Tc of at least 120° C., and/or
   (iii) a charpy notched impact strength measured according to ISO 179 (1 eA; 23° C.) of at least 30 kJ/m$^2$, and/or
   (iv) a tensile modulus measured according to ISO 527-2 of at least 1400 MPa.

5. Heterophasic propylene copolymer (HECO) according to claim 1, wherein the polypropylene (PP) has:
   (i) a melt flow rate MFR$_2$ (230° C.) measured according to ISO 1133 of equal or below 1.0 g/10 min and/or
   (ii) a comonomer content equal or below 1.0 wt. %, and/or
   (iii) a shear thinning index SHI (3/100) measured according to ISO 6271-10 (200° C.) of at least 20.0, and/or
   (iv) a xylene cold soluble (XCS) fraction measured according to ISO6427 (23° C.) of equal or below 3.5 wt. %.

6. Heterophasic propylene copolymer (HECO) according to claim 1, wherein the polypropylene (PP) comprises:
   (a) a first polypropylene (PP1) being a first propylene homopolymer (H-PP1) or a first random propylene copolymer (R-PP1),
   (b) a second polypropylene (PP2) being a second propylene homopolymer (H-PP2) or a second random propylene copolymer (R-PP2),
   (c) a third polypropylene (PP3) being a third propylene homopolymer (H-PP3) or a third random propylene copolymer (R-PP3),
   with the proviso that at least one of the three polypropylenes PP1, PP2, and PP3 is a propylene homopolymer, wherein further
      (i) the first polypropylene (PP1) has the lowest melt flow rate MFR2 (230° C.) measured according to ISO 1133 of the three polypropylenes PP1, PP2 and PP3, and/or
      (ii) the three polypropylenes PP1, PP2 and PP3 differ in the melt flow rate MFR2 (230° C.) measured according to ISO 1133.

7. Heterophasic propylene copolymer (HECO) according to claim 6, wherein the first polypropylene (PP1) being a first propylene homopolymer (H-PP1) has
   (i) a melt flow rate MFR$_2$ (230° C.) measured according to ISO 1133 of not more than 0.1 g/10 min, and/or
   (ii) comonomer content is not more than 2.5 wt. %, and/or
   (iii) a xylene cold soluble (XCS) fraction measured according to ISO6427 (23° C.) of equal or below 5.0 wt. %.

8. Heterophasic propylene copolymer (HECO) according to claim 6, wherein:
   (i) the second polypropylene (PP2) being a second propylene homopolymer (H-PP2) has a melt flow rate MFR2

(230° C.) measured according to ISO 1133 in the range of 0.005 to 2.0 g/10 min, and/or (ii) the third polypropylene (PP3) being a third propylene homopolymer (HPP3) has a melt flow rate $MFR_2$ (230° C.) measured according to ISO 1133 of at least 4.0 g/10 min.

9. Heterophasic propylene copolymer (HECO) according to claim 6, wherein the weight ratio between the first polypropylene (PP1) and the second polypropylene (PP2) is 80:20 to 25:75.

10. Heterophasic propylene copolymer (HECO) according to claim 1, wherein the comonomers of the elastomeric copolymer (EC) are ethylene and/or at least one $C_4$ to $C_{10}$ α-olefin.

11. Heterophasic propylene copolymer (HECO) claim 1, wherein the comonomer content of the amorphous phase (AM) of the xylene cold soluble fraction (XCS) of the heterophasic propylene copolymer (HECO) is below 40.0 wt. %.

12. Heterophasic propylene copolymer (HECO) according to claim 1, wherein the heterophasic propylene copolymer (HECO) comprises:
    (a) 80.0 to 94.0 wt. % of the polypropylene (PP), and
    (b) 6.0 to 20.0 wt. % of the elastomeric copolymer (EC), based on the total amount of the polypropylene (PP) and the elastomeric copolymer (BC).

13. Heterophasic propylene copolymer (HECO) according to claim 6, wherein the polypropylene (PP) comprises:
    (a) 15.0 to 35.0 wt. % of the first polypropylene (PP1),
    (b) 29.0 to 48.0 wt. % of the second polypropylene (PP2), and
    (c) 18.0 to 55.0 wt. % of the third polypropylene (PP3), based on the total amount of the first polypropylene (PP1), the second polypropylene (PP2), and the third polypropylene (PP3).

14. Process for the preparation of a heterophasic propylene copolymer (HECO) according to claim 1 in a sequential polymerization process, said heterophasic propylene copolymer (HECO) comprises a first polypropylene (PP1), a second polypropylene (PP2) and a third polypropylene (PP3), wherein said process comprises the steps of:
    (a1) polymerizing propylene and at least one ethylene and/or optionally at least one $C_4$ to $C_{12}$ α-olefin in a first reactor (R1) obtaining the first polypropylene (PP1), said first polypropylene (PP1) is a first propylene homopolymer (H-PP1),
    (b1) transferring the first polypropylene (PP1) in a second reactor (R2),
    (c1) polymerizing in the second reactor (R2) and in the presence of said first polypropylene (PP1) propylene and optionally at least one ethylene and/or a $C_4$ to $C_{12}$ α-olefin obtaining thereby the second polypropylene (PP2), said second polypropylene (PP2) is a second propylene homopolymer (H-PP2), the first polypropylene (PP1) being mixed with the second polypropylene (PP2),
    (d1) transferring the mixture of step (c1) in a third reactor (R3),
    (e1) polymerizing in the third reactor (R3) and in the presence of the mixture obtained in step (c1) propylene and optionally at least one ethylene and/or a $C_4$ to $C_{12}$ α-olefin obtaining thereby a third polypropylene (PP3), said third polypropylene (PP3) is a third propylene homopolymer (H-PP3), the first polypropylene (PP1), the second polypropylene (PP2) and the third polypropylene (PP3) form the polypropylene (PP),
    (f1) transferring the polypropylene (PP) in a fourth reactor (R4), and
    (g1) polymerizing in the fourth reactor (R4) and in the presence of the polypropylene (PP) propylene and at least one ethylene and/or a $C_4$ to $C_{12}$ α-olefin obtaining thereby a elastomeric propylene copolymer (EC), the polypropylene (PP) and the elastomeric propylene copolymer (EC) form the heterophasic propylene copolymer (HECO), or
    (a2) polymerizing propylene and at least one ethylene and/or a $C_4$ to $C_{20}$ α-olefin in a first reactor (R1) obtaining the second polypropylene (PP2), said second polypropylene (PP2) is a second propylene homopolymer (H-PP2),
    (b2) transferring the second polypropylene (PP2) in a second reactor (R2),
    (c2) polymerizing in the second reactor (R2) and in the presence of said second polypropylene (PP2) propylene and optionally at least one ethylene and/or a $C_4$ to $C_{12}$ α-olefin obtaining thereby the third polypropylene (PP3), said third polypropylene (PP3) is a third propylene homopolymer (H-PP3), the second polypropylene (PP2) being mixed with the third polypropylene (PP3),
    (d2) transferring the mixture of step (c2) in a third reactor (R3),
    (e2) polymerizing in the third reactor (R3) and in the presence of the mixture obtained in step (c2) propylene and optionally at least one ethylene and/or a $C_4$ to $C_{12}$ α-olefin obtaining thereby a first polypropylene (PP1), said first polypropylene (PP1) is a first propylene homopolymer (H-PP1), the first polypropylene (PP1), the second polypropylene (PP2) and the third polypropylene (PP3) form the polypropylene (PP),
    (f2) transferring the polypropylene (PP) in a fourth reactor (R4), and
    (g2) polymerizing in the fourth reactor (R4) and in the presence of the polypropylene (PP) propylene and at least one ethylene and/or a $C_4$ to $C_{12}$ α-olefin obtaining thereby a elastomeric propylene copolymer (EC), the polypropylene (PP) and the elastomeric propylene copolymer (EC) form the heterophasic propylene copolymer (HECO).

15. Pipes comprising a heterophasic propylene copolymer (HECO) according to claim 1.

* * * * *